(12) United States Patent
Jones

(10) Patent No.: US 12,045,068 B2
(45) Date of Patent: Jul. 23, 2024

(54) AUTONOMOUS INSPECTION SYSTEM AND METHOD

(71) Applicant: T-Mobile USA, Inc., Bellevue, WA (US)

(72) Inventor: Stephen Matthew Jones, Plano, TX (US)

(73) Assignee: T-Mobile USA, Inc, Bellevue, WA (US)

( * ) Notice: Subject to any disclaimer, the term of this patent is extended or adjusted under 35 U.S.C. 154(b) by 274 days.

(21) Appl. No.: 16/854,888

(22) Filed: Apr. 21, 2020

(65) Prior Publication Data
US 2021/0325910 A1    Oct. 21, 2021

(51) Int. Cl.
| | | |
|---|---|---|
| *G05D 1/00* | (2024.01) | |
| *B64C 39/02* | (2023.01) | |
| *B64F 1/36* | (2017.01) | |
| *B64U 10/13* | (2023.01) | |
| *B64U 101/30* | (2023.01) | |

(Continued)

(52) U.S. Cl.
CPC ............. *G05D 1/12* (2013.01); *B64C 39/024* (2013.01); *B64F 1/362* (2013.01); *G01C 21/20* (2013.01); *G01M 5/0033* (2013.01); *G01M 5/0075* (2013.01); *G01M 5/0091* (2013.01);
(Continued)

(58) Field of Classification Search
CPC .......... G05D 1/12; G05D 1/101; G01C 21/20; G01M 5/0033; G01M 5/0075; G01M 5/0091; B64C 39/024; B64C 2201/027; B64C 2201/123; B64C 2201/141; B64F 1/362
See application file for complete search history.

(56) References Cited

U.S. PATENT DOCUMENTS

| | | | | |
|---|---|---|---|---|
| 9,481,475 | B2 * | 11/2016 | Campillo | ................ B64F 1/007 |
| 10,564,649 | B2 * | 2/2020 | van Cruyningen | .... B64D 47/08 |

(Continued)

FOREIGN PATENT DOCUMENTS

CN          107479571 A  * 12/2017 ............. G05D 1/104

OTHER PUBLICATIONS

Antenna Theory—Radiation Pattern, Sep. 11, 2016, tutorialspoint, https://web.archive.org/web/20160911225343/https://www.tutorialspoint.com/antenna_theory/antenna_theory_radiation_pattern.htm (Year: 2016).*

*Primary Examiner* — Aniss Chad
*Assistant Examiner* — Christine Nguyen Huynh
(74) *Attorney, Agent, or Firm* — Foley IP Law, PLLC

(57) ABSTRACT

An autonomous inspection solution includes: a UAV having a navigation component and a first inspection sensor suite. The navigation component is configured to: autonomously deploy the UAV from a support vehicle; fly a first route at an inspection site, based at least upon a sensor type of the first inspection sensor suite; and autonomously return to the support vehicle upon completion of assigned inspections. In some examples, the first inspection sensor suite includes an optical camera, a thermal imaging sensor, an RF sensor, or an inventory management sensor, and a second inspection sensor suite has at least one different sensor than the first inspection sensor suite. The navigation component is further configured navigate the UAV to fly a second route, based at least upon a sensor type of the second inspection sensor suite. A data component stores or wirelessly transmits data received from the affixed inspection sensor suites.

20 Claims, 8 Drawing Sheets

(51) Int. Cl.
  *G01C 21/20* (2006.01)
  *G01M 5/00* (2006.01)

(52) U.S. Cl.
  CPC ............. *G05D 1/101* (2013.01); *B64U 10/13* (2023.01); *B64U 2101/30* (2023.01); *B64U 2201/10* (2023.01)

(56) References Cited

U.S. PATENT DOCUMENTS

| | | | |
|---|---|---|---|
| 10,871,774 B1* | 12/2020 | Stein | G06V 20/176 |
| 2017/0199647 A1* | 7/2017 | Richman | G08G 5/0013 |
| 2018/0002010 A1* | 1/2018 | Bauer | G08G 5/0065 |
| 2018/0074499 A1* | 3/2018 | Cantrell | G05D 1/0088 |
| 2018/0074521 A1* | 3/2018 | Cantrell | B60L 53/51 |
| 2021/0116248 A1* | 4/2021 | Inotsume | G01M 99/00 |

* cited by examiner

AUTONOMOUS INSPECTION SYSTEM AND METHOD

BACKGROUND

Cellular towers present challenges for inspectors, due to their height. Thus, some inspection processes use unmanned aerial vehicles (UAVs) with cameras, operated by a ground crew. Inspections may be routine, such as performing inventory control and checking for damage (anomalous conditions) after storms, or in preparation for a proposed modification, such as adding new antennas. Unfortunately, scheduling a work crew may add a delay to a newly-requested site inspection, due to potential worker unavailability.

SUMMARY

The following summary is provided to illustrate examples disclosed herein, but is not meant to limit all examples to any particular configuration or sequence of operations.

An autonomous inspection solution includes: a UAV having a navigation component and a first inspection sensor suite. The navigation component is configured to: autonomously deploy the UAV from a support vehicle; fly a first route at an inspection site, based at least upon a sensor type of the first inspection sensor suite; and autonomously return to the support vehicle upon completion of assigned inspections. In some examples, the first inspection sensor suite includes an optical camera, a thermal imaging sensor, an RF sensor, or an inventory management sensor, and a second inspection sensor suite has at least one different sensor than the first inspection sensor suite. The navigation component is further configured navigate the UAV to fly a second route, based at least upon a sensor type of the second inspection sensor suite. A data component stores or wirelessly transmits data received from the affixed inspection sensor suites. In some examples, the support vehicle comprises an unmanned ground vehicle (UGV), and the UAV autonomously returns upon completion of assigned inspections.

BRIEF DESCRIPTION OF THE DRAWINGS

The disclosed examples are described below with reference to the accompanying drawing figures listed below, wherein.

Figure 1:
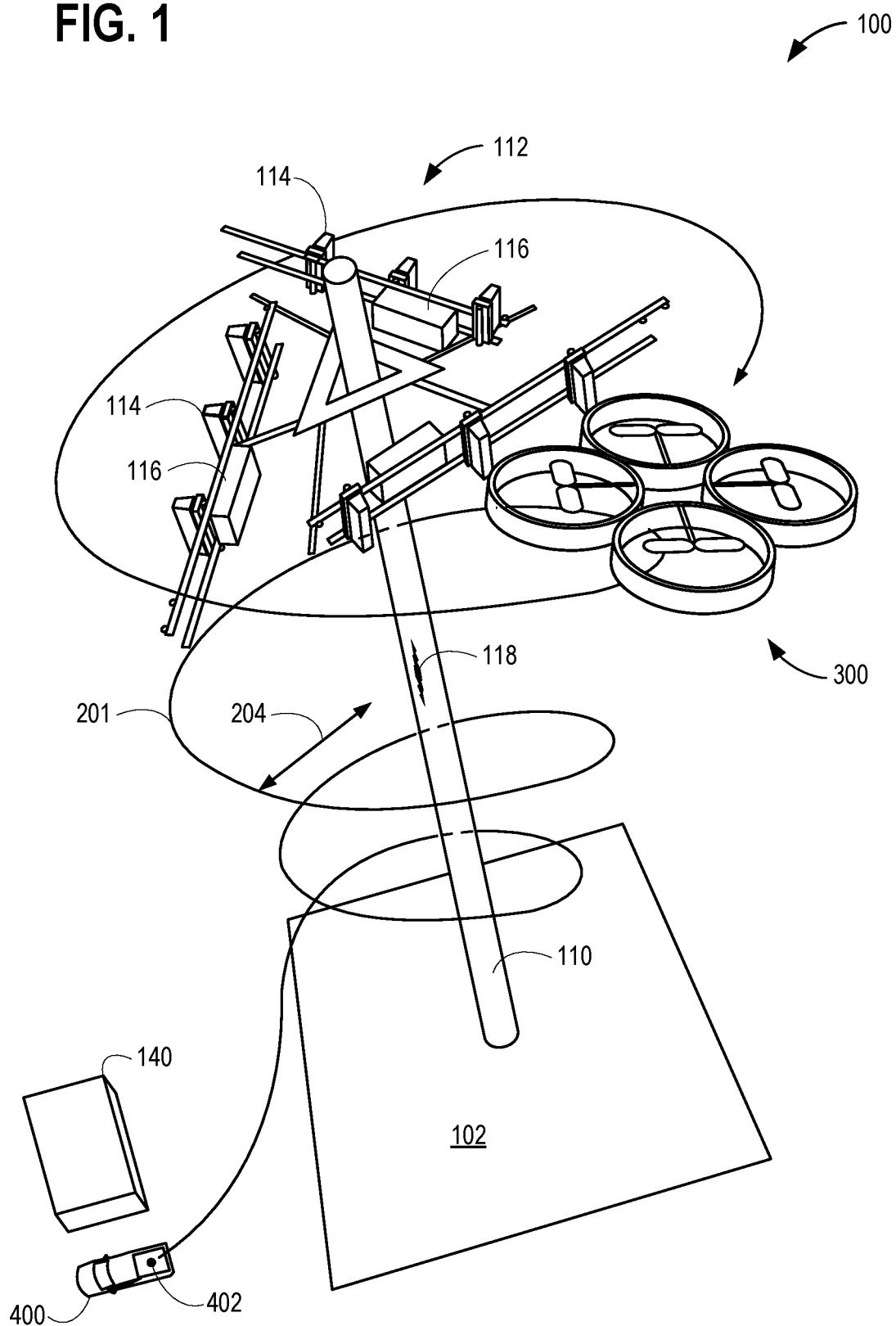
FIG. 1 illustrates an exemplary arrangement that may advantageously employ autonomous inspection.

Corresponding reference characters indicate corresponding parts throughout the drawings. References made throughout this disclosure. relating to specific examples, are provided for illustrative purposes, and are not meant to limit all implementations or to be interpreted as excluding the existence of additional implementations that also incorporate the recited features.

DETAILED DESCRIPTION

Autonomous deployment of inspection and test equipment, including utilizing self-driving vehicles (unmanned ground vehicles, UGVs) and pre-programmed autonomous unmanned aerial vehicles (UAVs, drones), allows greater availability, flexibility and response time and may reduce costs. In some examples, a UAV carries a variety of sensors and photography equipment and change as needed on site. For example, although observation of antennas with optical equipment (e.g., a camera) permits determination of antenna physical alignment (e.g., azimuth, tilt, plumb, and height), radio frequency (RF) measurements are able to confirm actual antenna beam pointing direction and compliance with spectrum requirements.

An autonomous inspection solution includes: a UAV having a navigation component and a first inspection sensor suite. The navigation component is configured to: autonomously deploy the UAV from a support vehicle; fly a first route at an inspection site, based at least upon a sensor type of the first inspection sensor suite; and autonomously return to the support vehicle upon completion of assigned inspections. In some examples, an inspection site may be a cellular tower site, a dam, a factory, a refinery, a chemical plant, or another construction or operations site. In some examples, the first inspection sensor suite includes an optical camera, a thermal imaging sensor, an RF sensor, or an inventory management sensor, and a second inspection sensor suite has at least one different sensor than the first inspection sensor suite. The navigation component is further configured navigate the UAV to fly a second route, based at least upon a sensor type of the second inspection sensor suite. A data component stores or wirelessly transmits data received from the affixed inspection sensor suites.

An autonomous UAV, with a plurality of sensor options, such as an optical camera, a thermal, RF, and RFID/barcode reader) deploys from a support vehicle, such as an autonomous ground vehicle (UGV), in order to perform inspections at various sites (e.g., cell tower sites) without the need to constrain schedules by inspection crew availability. This should increase flexibility and reduce operating costs. The UAV docks to, recharges, and automatically deploys from, the support vehicle, and in some examples swaps out sensor packs (inspection sensor suites) at the support vehicle between inspection tasks and/or backs up data to the support vehicle. The support vehicle may recharge at (some) inspection sites. Various sensors permit different types of inspection, such as inspecting for damage and wildlife issues (e.g., bird nests and wind damage) and conformance to specifications for transmitted RF spectrum and power.

Different types of inspections may require different routes. For example, inspections with a camera may need to fly close to the tower along a significant portion of its height, pointing the camera at the tower's physical structure, whereas RF identification (RFID) and barcode sensing may require only hovering in the vicinity of inventory-controlled items, and RF testing may require flying around the antennas, preferably in the far field of the antennas, to ascertain antenna radiation characteristics. In some examples, a route may change if an anomalous condition (e.g., damage or a foreign object such as a bird nest) is detected, in order to make a secondary or closer examination. Various types of inspection sensors include: optical cameras, thermal imagers, inventory management sensors (e.g., RFID readers and barcode scanners), RF sensors (e.g., RF field strength sensors and RF spectrum analyzers), cellular protocol (e.g., 5G) test equipment, internet of things (IoT) support capability test equipment, and others.

Aspects of the disclosure improve site management flexibility and speed data collection by reducing the dependence on work crew scheduling. Aspects of the disclosure improve site management effectiveness by providing a result of multiple different types of inspection and test data to a data store for analysis by different business units.

FIG. 1 illustrates an exemplary arrangement 100 that may advantageously employ autonomous inspection. A UAV 300 autonomously deploys from a support vehicle 400, performs assigned inspections at a first inspection site 102, and autonomously returns to support vehicle 400 based at least upon completion of the assigned inspections. UAV 300 is described in additional detail in relation to FIG. 3, and support vehicle 400 is described in additional detail in relation to FIG. 4. First inspection site 102 has a tower 110 (e.g., a cellular base station tower), with an antenna mount 112, and a site support structure 140 that may be a site support cabinet or a site support shed. Antenna mount 112 is illustrated as hosting nine antennas 114 and three equipment boxes 116 (for clarity of the figure, not all elements are numbered). It should be understood that other examples of tower 110 may have a different number of antenna mounts 112, a different number of antennas 114, and/or a different number of equipment boxes 116. In some examples, inspection site may be a dam, a factory, a refinery, a chemical plant, or another construction or operations site.

UAV 300 deploys from an internal UAV hangar 402 of support vehicle 400, and flies an inspection route 201, subject to collision avoidance, at inspection site 102. As illustrated, inspection route 201 is a spiral route around tower 110, and is based at least upon a sensor type of an inspection sensor suite 350 (see FIG. 3 for further detail). For example, if inspection sensor suite 350 includes an optical camera, inspection route 201 permits a visual inspection of tower 110 over most or all of its height. UAV 300 detects an anomalous condition 118 on tower 110. Anomalous conditions may include damage from storms (e.g., wind, hail, and lightning) and foreign objects, such as bird nests and wind-deposited debris. UAV 300 deviates from inspection route 201 to anomaly inspection route 204, based at least upon detecting anomalous condition 118, for further investigation (e.g., a closer image) of anomalous condition 118. UAV 300 then resumes inspection route 201.

Figure 2A:
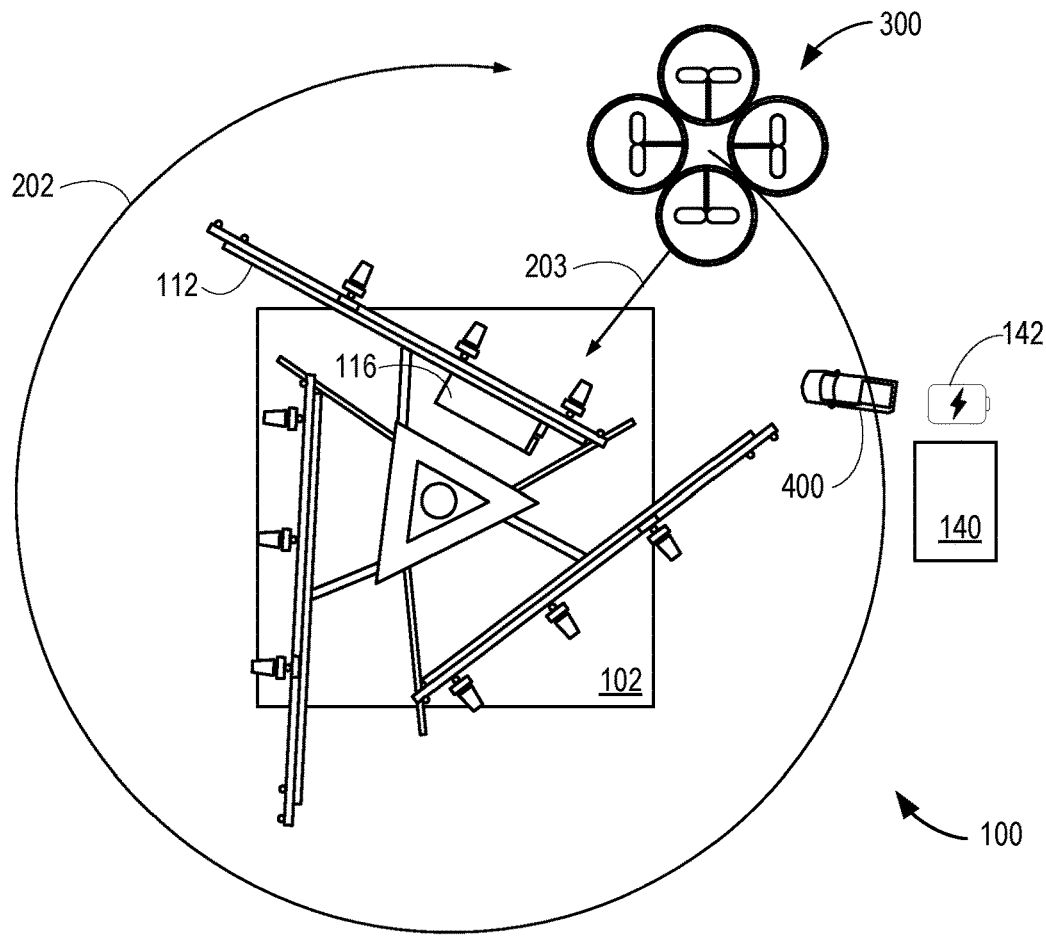
FIG. 2A illustrates a top view of the arrangement of FIG. 1.

FIG. 2A illustrates a top view of the arrangement 100. In FIG. 2, UAV 300 flies an inspection route 202, subject to collision avoidance, at inspection site 102. Inspection route 202 is based at least upon a sensor type of an inspection sensor suite 350a (see FIG. 3), which has at least one different sensor type than inspection sensor suite 350. For example, whereas inspection sensor suite 350 comprises an optical camera and inspection route 201 is a route for inspecting tower 110 inspection site 102 for damage and foreign objects (e.g., anomalous condition 118), inspection sensor suite 350a comprises an RF sensor and inspection route 202 is a route for collecting antenna 113 or radio transmitter performance measurements at a far field distance from antenna 114 on tower 110 at inspection site 102. In some examples, UAV 300 returns to support vehicle 400 to swap out inspection sensor suite 350 for inspection sensor suite 350a. This may occur, for example, if the combination of both inspection sensor suites 350 and 350a is too heavy or bulky for UAV 300 to carry together without depleting power too rapidly. For example, UAV 300 may be configured to automatically detach inspection sensor suites 350 at support vehicle 400 and automatically affix inspection sensor suites 350a at support vehicle 400.

Equipment box 116 may be employed as operating equipment, for example, to enable tower 110 to function as a cellular tower in a cellular network. UAV 300 may engage yet additional inspection sensor suites (e.g., inspection sensor suites 350b and 350c of FIGS. 3 and 4) to inspect equipment box 116, for example a thermal imaging sensor or an inventory management sensor (e.g., an RFID reader or a barcode scanner). A thermal imaging sensor may detect whether equipment box 116 has spots of excessive heat, indicating a need for a maintenance action. UAV 300 flies an inspection route 203 to obtain a closer view of equipment box 116, and may return to support vehicle 400 to swap out inspection sensor suites 350a for 350b, based on the weight and/or dimensions of the various inspection sensor suites. As illustrated, there is a support vehicle recharging station 142 at inspection site 102, which may be used to recharge support vehicle 400.

Figure 2B:
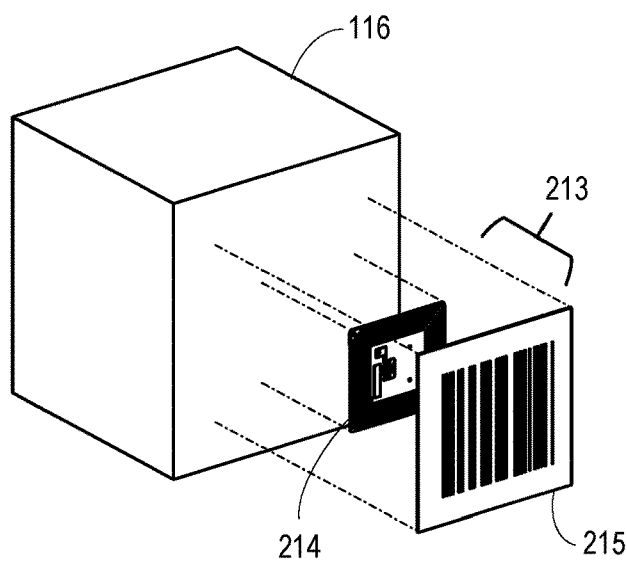
FIGS. 2B and 2C illustrate finer detail for a component of the arrangement of FIG. 1.
Figure 2C:
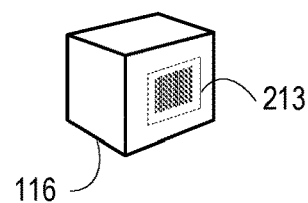

FIGS. 2B and 2C illustrate finer detail for equipment box 116. An RFID tag 213 is used for equipment tracking and is shown as comprising electrical components 214 and an optical barcode label 215. RFID tag 213 is configured to be affixed to equipment box 116 so that optical barcode label 215 provides environmental protection for electrical components 214 of RFID tag 213. Optical barcode label 215 provides a backup or alternative way to equipment box 116 if, for example, an RFID tag code that is encoded into electrical components 214 cannot be read.

Figure 3:
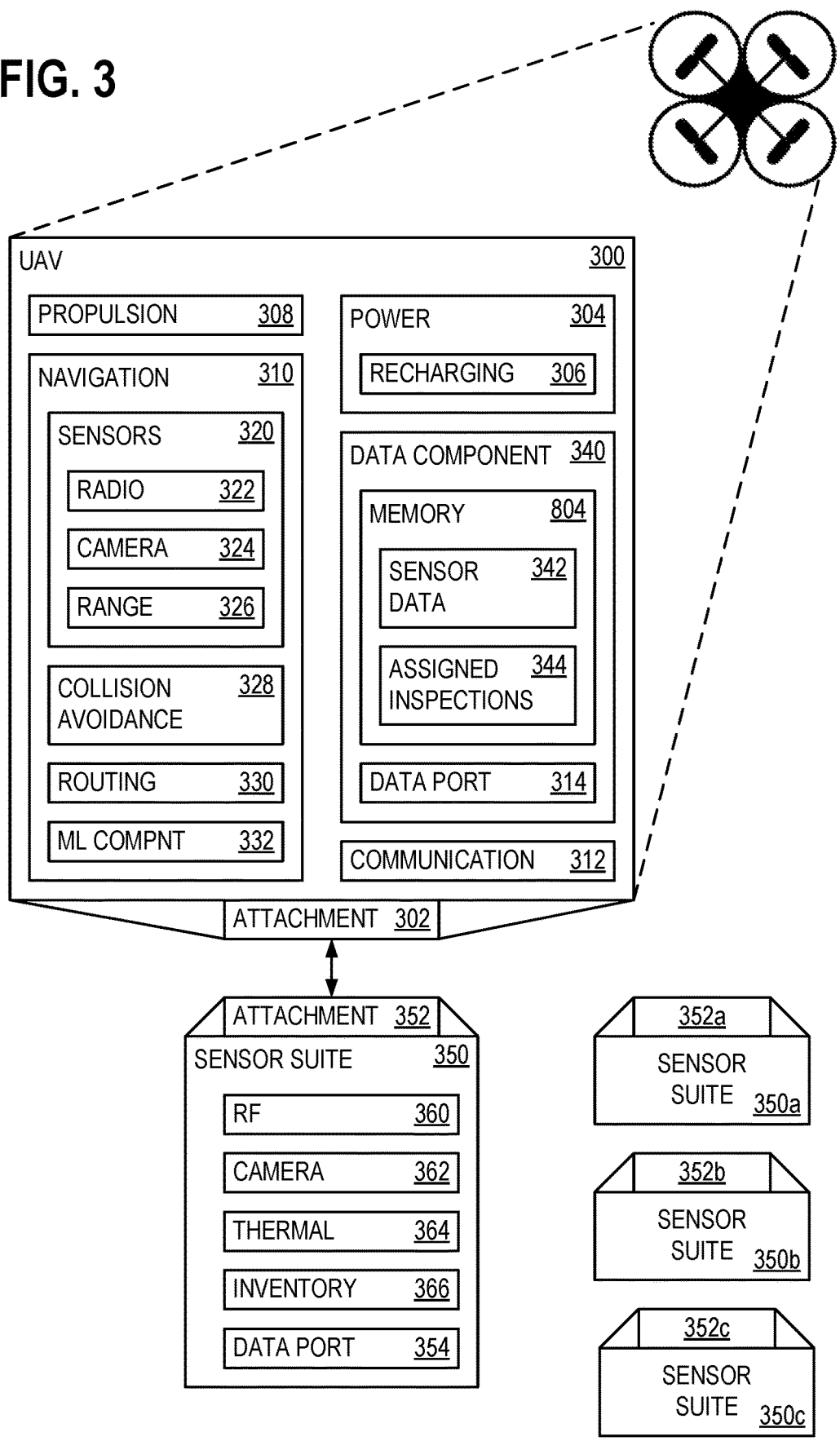
FIG. 3 illustrates an unmanned aerial vehicle (UAV) that may be used in the arrangement of FIG. 1.

FIG. 3 illustrates UAV 300 in further detail. UAV 300 has an attachment mechanism 302, to attach and detach any of inspection sensor suites 350, 350a, 350b, and 350c. Inspection sensor suites 350, 350a, 350b, and 350c each have a corresponding attachment mechanism 352, 352a, 352b, and 352c, respectively, to be used for affixing to UAV 300. UAV 300 comprises a power component 304, which may be a rechargeable battery and includes a recharging port 306 that may be wired or wireless. Recharging port 306 permits recharging of power component 304, for example when UAV 300 is docked at support vehicle 400. A propulsion component 308 is coupled to power component 304, so that power component 304 is able to power propulsion component 308 in order for UAV 300 to fly. A navigation component 310 is coupled to propulsion component 308 in order to direct the direction, height, and speed of the flight. Navigation component 310 comprises a navigation sensor suite 320 ("sensors") that comprises a sensor selected from the list consisting of: a radio-based position tracker 322 (e.g., a GPS receiver), an optical camera 324, and a range finder 326. Other sensors may also be used. Navigation component 310 is configured for collision avoidance using at least input from navigation sensor suite 320 and collision avoidance logic 328.

UAV 300 flies routes according to routing data and logic 330 in navigation component 310. Thus, navigation component 310 is configured navigate UAV 300 to fly an inspection route, subject to collision avoidance, at inspection site 102, based at least upon a sensor type of inspection sensor suite 350 (or another sensor suite). In some examples, navigation component 310 is configured to deviate from the inspection route, based at least upon detecting an anomalous condition (e.g., anomalous condition 118) with sensor suite (or another sensor suite), for further investigation of the anomalous condition. In some examples, navigation component 310 uses artificial intelligence (AI) or machine learning (ML), together referred to herein as ML. In some examples, navigation component 310 comprises an ML component 332, and deviation from the originally-planned inspection route is determined by ML component 332.

A data component 340 is communicatively coupled to inspection sensor suite 350 (or whichever other inspection sensor suite is affixed to UAV 300) via data ports 314 and 354. Data component 340 has a memory 804 and is configured to store or wirelessly transmit data received from inspection sensor suite 350 (or another inspection sensor suite). The received data is stored as sensor data 342. In some examples, a communication component 312 wirelessly transmits the received data (e.g., sensor data 342) to support vehicle 400. Alternatively, or in addition, data port 314 may also be used to back up sensor data 342 to a data component 440 in support vehicle 400 (see FIG. 4), when UAV 300 is docked to support vehicle 400. A set of assigned inspections 344 provides tasking for UAV 300, and is referenced by routing data and logic 330, along with an identification of the sensor types available with an attached sensor suite. In some examples, UAV 300 autonomously returns to support vehicle 400, based at least upon completion of assigned inspections listed within set of assigned inspections 344.

Inspection sensor suite 350 comprises a sensor selected from the list consisting of: an optical camera 362, a thermal imaging sensor 364, an RF sensor 360, and an inventory management sensor 366. In some examples. RF sensor 360 comprises a sensor selected from the list consisting of: an RF field strength sensor and an RF spectrum analyzer. Inventory management sensor 366 comprises a sensor selected from the list consisting of: an RFID reader and a barcode scanner. In some examples, inspection sensor suite 350 has multiple sensor types and can perform multiple types of inspections. In such examples, UAV 300 may fly multiple inspection routes, with the different inspection routes each based on one or more of the sensor types.

Other inspection sensor suites 352a-352c may also be used by UAV 300, each configured for a specific type of inspection (e.g., with at least one unique sensor type) and thus each may be associated with a different inspection route. The with the sizes and weights of inspection sensor suites 352-352c, and thus the specific sensor types and numbers may be constrained by the size and weight-carrying capacity of UAV 300. For example, inspection sensor suite 350 may have optical camera 362; inspection sensor suite 350a may have RF sensor 360; inspection sensor suite 350b may have thermal imaging sensor 364; and inspection sensor suite 350b may have inventory management sensor 366. In some examples, UAV 300 is configured to automatically detach one inspection sensor suite and automatically affix s different inspection sensor suite. In some examples, these actions occur at support vehicle 400.

Figure 4:
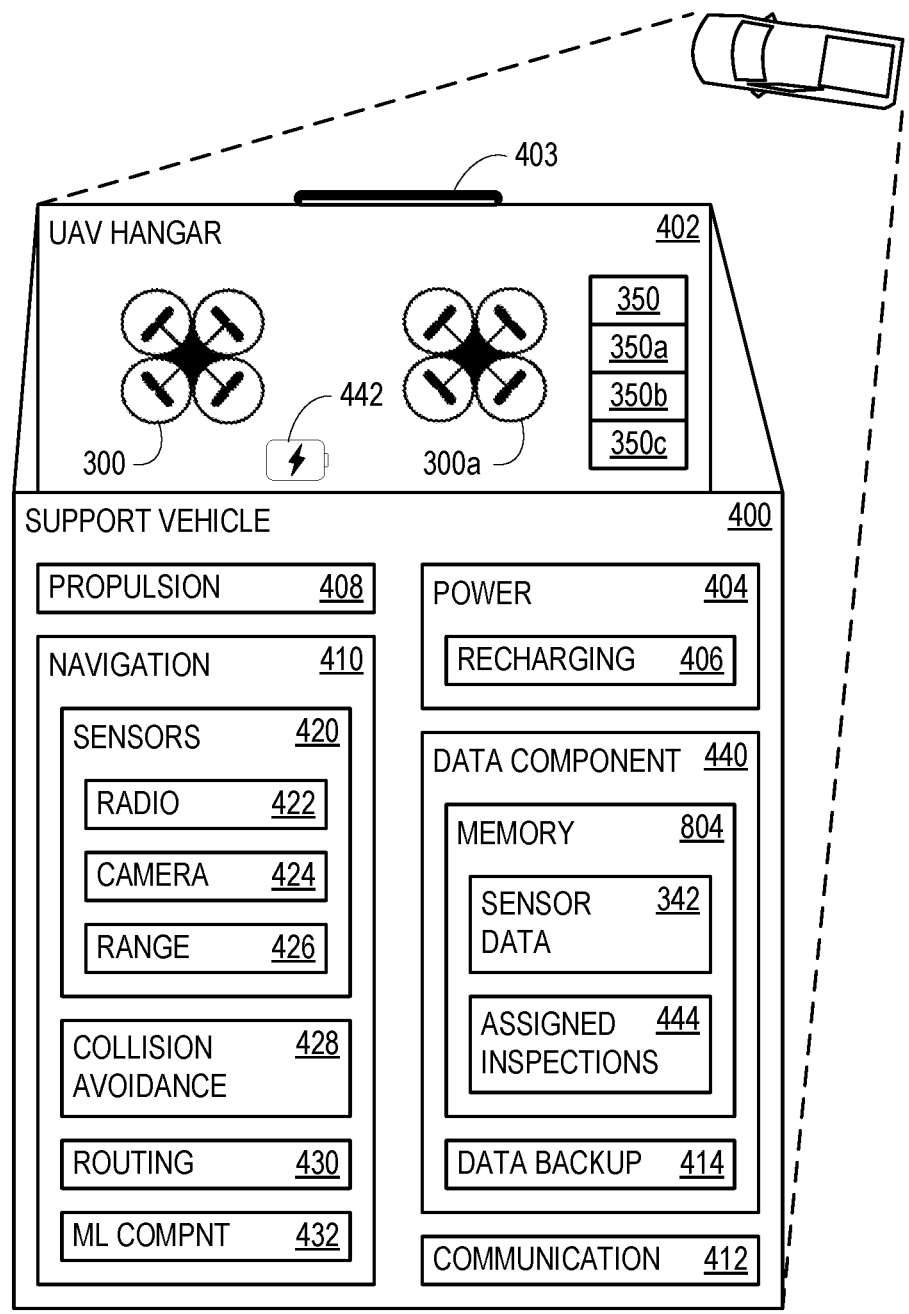
FIG. 4 illustrates a support vehicle that may be used in the arrangement of FIG. 1.

FIG. 4 illustrates support vehicle 400 in further detail. Support vehicle 400 comprises internal UAV hangar 402 and hangar door 403, which is configured to automatically open to permit deployment of UAV 300 from support vehicle 400 and to automatically close when UAV 300 is within internal UAV hangar 402, to protect UAV 300 during navigation of support vehicle 400. A second UAV 300a, which may be similarly-equipped as UAV 300, is also shown within internal UAV hangar 402, along with inspection sensor suites 350-350c. It should be understood that support vehicle 400 may carry a different number of UAVs and inspection sensor suites than is illustrated. A UAV recharging station 442 on support vehicle 400 is configured to recharge power component 304 of UAV 300 (and UAV 300a), for example via recharging port 306 (see FIG. 3), when UAV 300 is docked at support vehicle 400 within internal UAV hangar 402. In some examples, UAV recharging station 442 comprises a wireless UAV recharging station configured to wirelessly recharge power component 304 of UAV 300.

Support vehicle 400 comprises a power component 404, which may a rechargeable battery that includes a recharging port 406 that may be wired or wireless, and permits recharging of power component 404, for example, via support vehicle recharging station 142 at inspection site 102. A propulsion component 408 is coupled to power component 404, so that power component 404 is able to power propulsion component 408 in order to for support vehicle 400 to drive to one or more inspection sites. In some examples, support vehicle 400 comprises a UGV. In such examples, a navigation component 410 is coupled to propulsion component 408 in order to control the driving of support vehicle 400. Navigation component 410 comprises a navigation sensor suite 420 that comprises a sensor selected from the list consisting of: a radio-based position tracker 422 (e.g., a global positioning system (GPS) receiver), an optical camera 424, and a range finder 426. Other sensors may also be used. Navigation component 410 is configured for collision avoidance using at least input from navigation sensor suite 420 and collision avoidance logic 428.

In some examples, support vehicle 400 is configured to autonomously navigate from a staging location 520 (see FIG. 5) to inspection site 102. In some examples, support vehicle 400 is further configured to autonomously navigate from inspection site 102 to a second inspection site 102a (see FIG. 5). Support vehicle 400 navigates according to routing data and logic 430 in navigation component 410. In some examples, navigation component 410 comprises an ML component 432.

A data component 440 may be communicatively coupled to UAV 300 or 300a via a data backup component 414, which then backs up data received from UAV 300 or 300a (e.g., sensor data 342) to memory 804. In some examples, a communication component 412 wirelessly receives the data (e.g., sensor data 342) from UAV 300 under the control of data backup component 414. Communication component 412 forwards sensor data 342 to monitoring node 502 (see FIG. 5). A set of assigned inspections 444 provides tasking for support vehicle 400, and is referenced by routing data and logic 430 to identify inspection site 102, and other inspection sites, as destinations for support vehicle 400. Set of assigned inspections 444 may be used to generate set of assigned inspections 344 for UAV 300 (see FIG. 3). In some examples, set of assigned inspections 344 includes only inspections assigned to UAV 300 for the currently-visited inspection site, and set of assigned inspections 444 includes all inspections for all UAVs carried by support vehicle 400 for a plurality is scheduled inspection sites. In such examples, as part of the deployment of UAV 300, the relevant inspection tasks are copied from set of assigned inspections 444 to set of assigned inspections 344. In some examples, support vehicle 400 autonomously returns to staging location 520, based at least upon completion of assigned inspections listed within set of assigned inspections 444.

Figure 5:
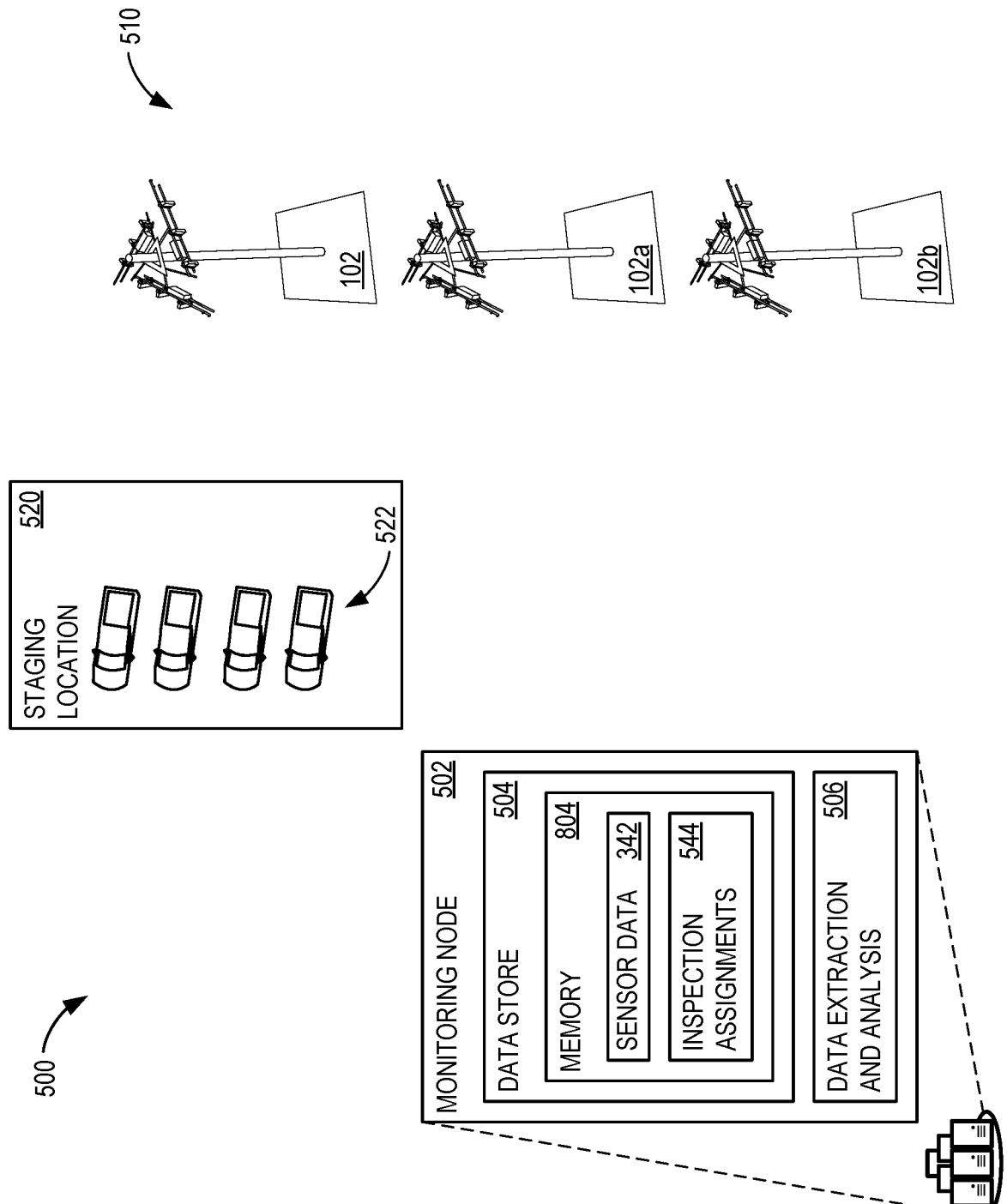
FIG. 5 illustrates a network that may advantageously employ autonomous inspection.

FIG. 5 illustrates a network 500 that may advantageously employ autonomous inspection. Network 500 has a monitoring node 502 that stores sensor data 342, received from a fleet of UAVs 300, in memory 804 of a data store 504. Data store 504 provides a site history analysis capability via a data extraction and analysis component 506 that permits generating reports of condition, maintenance, and repair histories for a plurality of inspection sites 510. This capability, provided without the need to constrain schedules by inspection crew availability, improves site management effectiveness by providing a result of multiple different types of inspection and test data to a data store for analysis by different business units.

Plurality of inspection sites 510 comprises multiple individual inspection sites 102, 102a, and 102b, which have similar configurations, but may also vary in terms of the number of antennas 114 and other factors. A staging location 520 (a depot) holds a plurality of support vehicles 522, which is tasked with performing autonomous inspections for plurality of inspection sites 510. Plurality of support vehicles 522 comprises multiple individual support vehicles 400 configured as described above.

Figure 6:
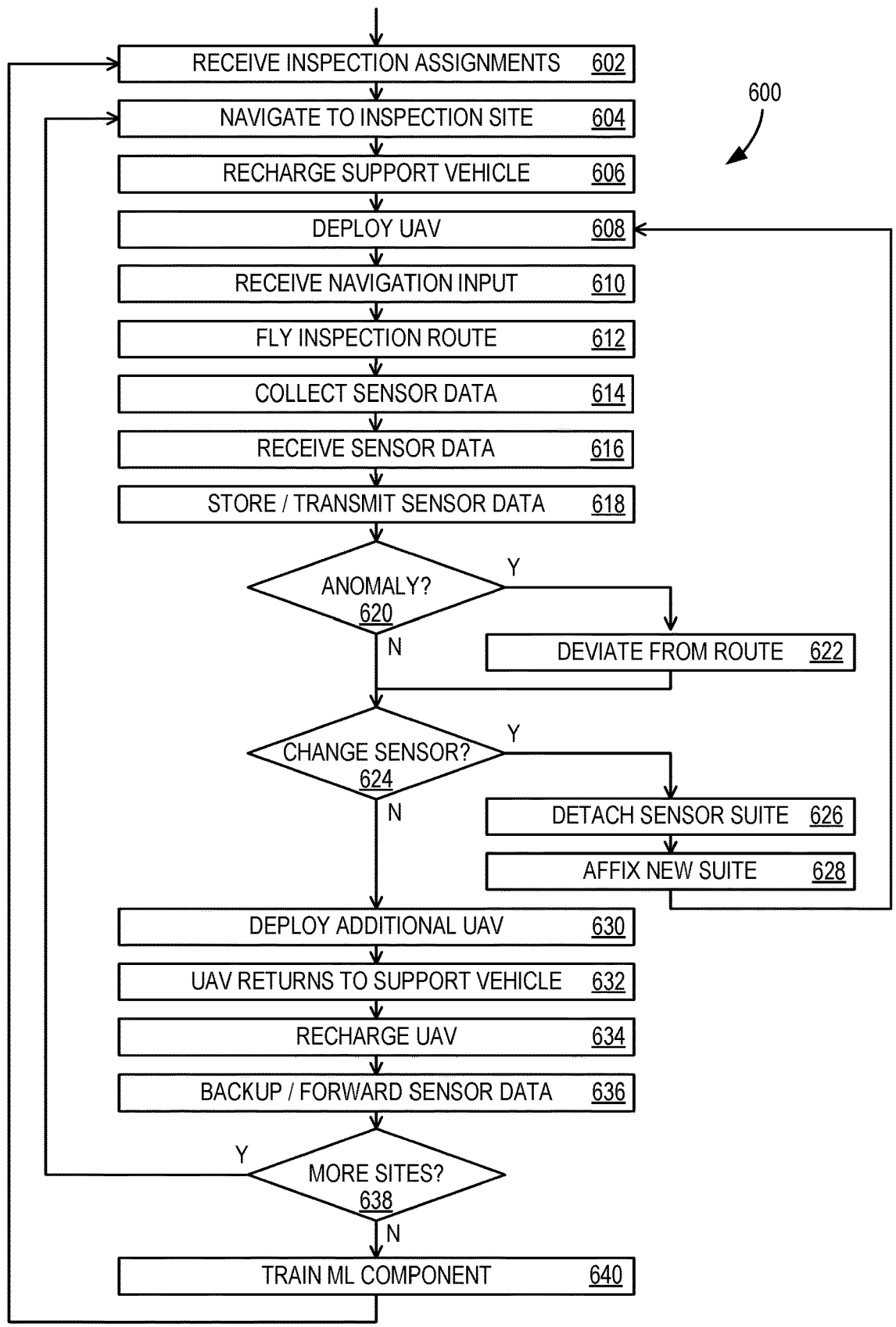
FIG. 6 illustrates a flow chart of exemplary operations associated with autonomous inspection.

FIG. 6 illustrates a flow chart 600 for a method of autonomous inspection. In some examples, at least a portion of flow chart 600 may be performed using one or more computing devices 800 of FIG. 8. FIG. 6 should be viewed along with FIGS. 1-5. Inspection assignments are received from inspection assignments 544 and stored as assigned inspections 344 and 444, in operation 602. Operation 604 includes autonomously navigating, by the support vehicle, to an inspection site. In a first pass, this is autonomously navigating, by the support vehicle, from a staging location to the first inspection site. For example, support vehicle 400 autonomously navigates from staging location 520 to inspection site 102. In a second pass, this includes autonomously navigating, by the support vehicle, from the first inspection site to a second inspection site. Operation 606 includes recharging the support vehicle using a support vehicle recharging station at the first inspection site (e.g., support vehicle recharging station 142 inspection site 102). In some example, operation 606 includes wirelessly recharging the support vehicle using a support vehicle recharging station at the first inspection site. Operation 606 may extend for as long as, or even longer than, all of the other operations performed at the inspection site.

Operation 608 includes autonomously deploying a UAV from a support vehicle, for example deploying UAV 300 or 300a from support vehicle 400. In some examples, this includes updating the UAV's on-board copy of assigned inspections, such as updating set of assigned inspections 344 from set of assigned inspections 444. Operation 610 includes receiving input from a navigation sensor suite of the UAV, for example from navigation sensor suite 320, to enable the UAV to fly autonomously. Operation 612 includes flying an inspection route, subject to collision avoidance using at least input from the navigation sensor suite, at the inspection site, wherein the first route is based at least upon a sensor type of a first inspection sensor suite of the UAV. So, for example, one or more of inspection routes 201, 202, and 203 is flown, based at least on a sensor type of whichever of inspection sensor suites 350-350c is affixed to UAV 300. Operation 614 includes collecting data with the affixed inspection sensor suite, and operation 616 includes receiving, by a data component of the UAV, data from the first inspection sensor suite. Operation 618 includes storing or wirelessly transmitting the data received by the data component, for example storing sensor data 342 in data component 340 or transmitting sensor data 342 to support vehicle 400 using communication component 312.

Decision operation 620 detecting an anomalous condition with the affixed inspection sensor suite, and operation 622 includes deviating from the original inspection route, based at least upon detecting an anomalous condition with the affixed inspection sensor suite, for further investigation of the anomalous condition. For example, UAV 300 may deviate from inspection route 201 to anomaly inspection route 204, based upon detecting anomalous condition 118. In some example, operation 606 includes automatically deviating from the first/second route, based at least on detecting an anomalous condition with the first inspection sensor suite, for further investigation of the anomalous condition. After completing all of the inspection routes with the affixed inspection sensor suite, the UAV may need to swap out the inspection sensor suite for another one, for additional inspections.

Decision operation 624 determines whether inspections with an additional inspection sensor suite are needed, for example, by referencing assigned inspections 344. If so, operation 626 includes automatically detaching the first inspection sensor suite. In some examples, the UAV may need to return to the support vehicle for this, so in some example, operation 626 includes automatically detaching the first inspection sensor suite at the support vehicle. Operation 628 includes automatically affixing the second inspection sensor suite. In some example, operation 628 includes automatically affixing the second inspection sensor suite at the support vehicle. For example, UAV 300 may return to support vehicle 400 to detach inspection sensor suite 350 and affix inspection sensor suite 350a. Flow chart 600 returns to operation 608 with the new inspection sensor suite.

As an alternative to using only a single UAV to perform all inspections, a plurality of UAVs with differing inspection sensor suites may be used. Thus, operation 630 includes autonomously deploying a second UAV from the support vehicle; the second UAV having a third inspection sensor suite having at least one different sensor type than the first inspection sensor suite; flying a third route, by the second UAV, subject to collision avoidance, at the first inspection site, wherein the third route is based at least upon a sensor type of the third inspection sensor suite; receiving, by a second data component of the second UAV, data from the third inspection sensor suite; autonomously returning the second UAV to the support vehicle, based at least upon completion of assigned inspections; and storing or wirelessly transmitting the data received by the second data component.

Operation 632 includes autonomously returning the UAV to the support vehicle, based at least upon completion of assigned inspections, and operation 634 includes recharging a power component of the UAV using a UAV recharging station on the support vehicle. In some example, operation 634 includes wirelessly recharging a power component of the UAV using a UAV recharging station on the support vehicle. Operation 636 includes performing a data backup on the support vehicle, for example copying sensor data 342 from data component 340 on UAV 300 to data component 440 on support vehicle 400. Support vehicle is able to forward sensor data 342 to data store 504 within monitoring node 502 using communication component 412, as part of operation 636.

Decision operation 638 determines whether operations 604-636 should be repeated for other inspection sites, for example, based at least on assigned inspections 444. Operation 640 includes training the ML component, for example training ML component 332 and/or ML component 432. Flow chart 600 returns to operation 602 for the support vehicles next tasking. For examples that include a fleet of support vehicles, the return to operations 602-640 may also include autonomously deploying a plurality of support vehicles to a plurality of inspection sites (e.g., plurality of support vehicles 522 deployed to plurality of inspection sites 510), each support vehicle having at least one UAV; and each UAV configured to autonomously deploy from its respective support vehicle, fly a route based at least upon a sensor type of an affixed inspection sensor suite, automatically return to its respective support vehicle, based at least upon completion of assigned inspections, and store or wirelessly transmit data received from the affixed inspection sensor suite.

Figure 7:
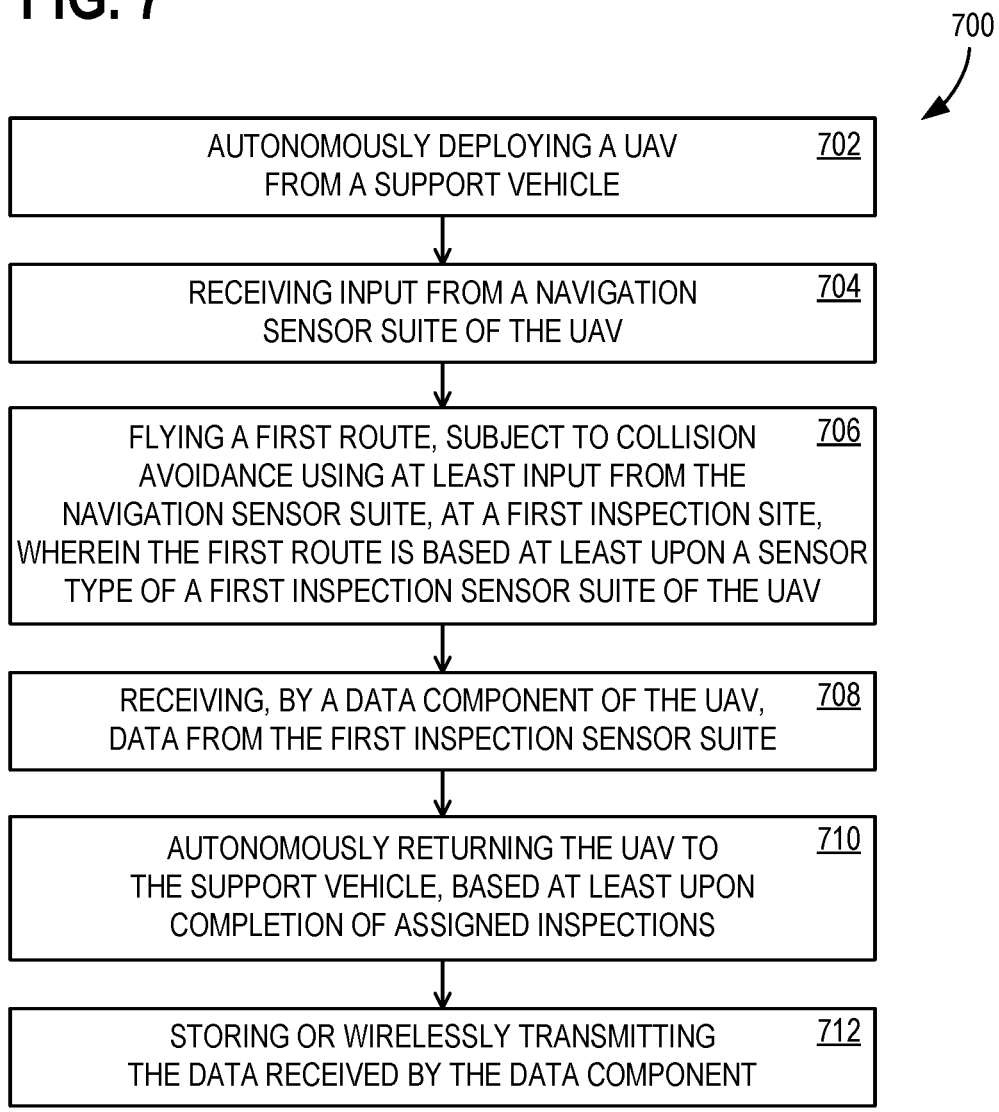
FIG. 7 illustrates another flow chart of exemplary operations associated with autonomous inspection.

FIG. 7 illustrates a flow chart 700 for a method of autonomous inspection. In some examples, at least a portion of flow chart 700 may be performed using one or more computing devices 800 of FIG. 8. Operation 702 includes autonomously deploying a UAV from a support vehicle. Operation 704 includes receiving input from a navigation sensor suite of the UAV. Operation 706 includes flying a first route, subject to collision avoidance using at least input from the navigation sensor suite, at a first inspection site, wherein the first route is based at least upon a sensor type of a first inspection sensor suite of the UAV. Operation 708 includes receiving, by a data component of the UAV, data from the first inspection sensor suite. Operation 710 includes autonomously returning the UAV to the support vehicle, based at least upon completion of assigned inspections. Operation 712 includes storing or wirelessly transmitting the data received by the data component.

Figure 8:
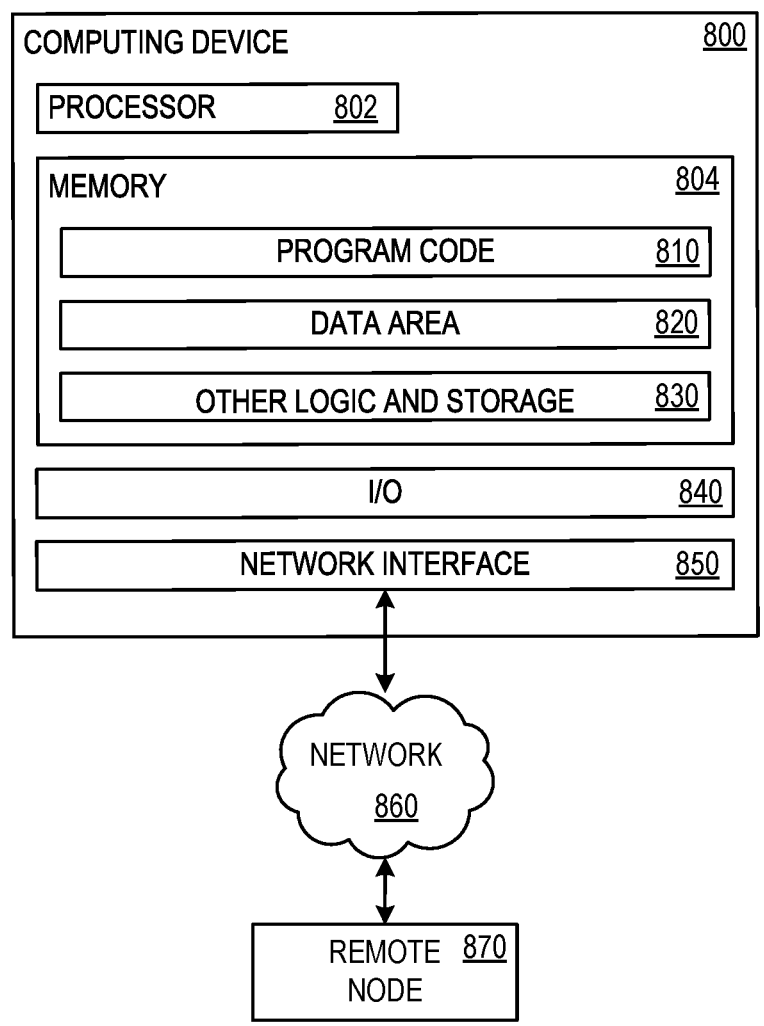
FIG. 8 illustrates a block diagram of a computing device that may be used as a component of the arrangement illustrated in FIG. 1 or the network of FIG. 5.

FIG. 8 illustrates a block diagram of computing device 800 that may be used within arrangement 100 of FIG. 1 or the network of FIG. 5, for example as a portion of monitoring node 502, navigation component 310 or 410, data component 340 or 440, and/or any other component described herein that may require computational or storage capacity. Computing device 800 has at least a processor 802 and a memory 804 that holds program code 810, data area 820, and other logic and storage 830. Memory 804 is any device allowing information, such as computer executable instructions and/or other data, to be stored and retrieved. For example, memory 804 may include one or more random access memory (RAM) modules, flash memory modules, hard disks, solid-state disks, persistent memory devices, and/or optical disks. Program code 810 comprises computer executable instructions and computer executable components including any instructions necessary to perform operations described herein. Data area 820 holds any data necessary to perform operations described herein. Memory 804 also includes other logic and storage 830 that performs or facilitates other functions disclosed herein or otherwise required of computing device 800. An input/output (I/O) component 840 facilitates receiving input from users and other devices and generating displays for users and outputs for other devices. A network interface 850 permits communication over a network 860 with a remote node 870, which may represent another implementation of computing device 800. For example, a remote node 870 may represent monitoring node 502.

ADDITIONAL EXAMPLES

An exemplary autonomous inspection system comprises: a UAV comprising: a power component; a propulsion component coupled to the power component; a navigation component coupled to the propulsion component, the navigation component comprising a navigation sensor suite; a first inspection sensor suite; and a data component communicatively coupled to the first inspection sensor suite; wherein the navigation component is configured for collision avoidance using at least input from the navigation sensor suite; wherein the navigation component is further configured to: autonomously deploy the UAV from a support vehicle; navigate the UAV to fly a first route, subject to collision avoidance, at a first inspection site, wherein the first route is based at least upon a sensor type of the first inspection sensor suite; and autonomously return to the support vehicle, based at least upon completion of assigned inspections; and wherein the data component is configured to store or wirelessly transmit data received from the first inspection sensor suite.

An example method of autonomous inspection comprises: autonomously deploying a UAV from a support vehicle; receiving input from a navigation sensor suite of the UAV; flying a first route, subject to collision avoidance using at least input from the navigation sensor suite, at a first inspection site, wherein the first route is based at least upon a sensor type of a first inspection sensor suite of the UAV; receiving, by a data component of the UAV, data from the first inspection sensor suite; autonomously returning the UAV to the support vehicle, based at least upon completion of assigned inspections; and storing or wirelessly transmitting the data received by the data component.

Another exemplary autonomous inspection system comprises: a first inspection sensor suite; a second inspection sensor suite having at least one different sensor type than the first inspection sensor suite, wherein the first inspection sensor suite and the second inspection sensor suite each comprises a sensor selected from the list consisting of: an optical camera, a thermal imaging sensor, an RF sensor, and an inventory management sensor; a support vehicle, wherein the support vehicle comprises a UGV configured to autonomously navigate from a staging location to a first inspection site and from the first inspection site to a second inspection site; a UAV comprising: a power component; a propulsion component coupled to the power component; a navigation component coupled to the propulsion component, the navigation component comprising a navigation sensor suite; and a data component communicatively coupled to the first inspection sensor suite and the second inspection sensor suite, sequentially; wherein the navigation component is configured for collision avoidance using at least input from the navigation sensor suite; wherein the navigation component is further configured to: autonomously deploy the UAV from a support vehicle; navigate the UAV to fly a first route, subject to collision avoidance, at the first inspection site, wherein the first route is based at least upon a sensor type of the first inspection sensor suite; automatically detach the first inspection sensor suite at the support vehicle; automatically affix the second inspection sensor suite at the support vehicle; navigate the UAV to fly a second route, subject to collision avoidance, at the first inspection site, wherein the second route is based at least upon a sensor type of the second inspection sensor suite; and autonomously return to the support vehicle, based at least upon completion of assigned inspections; and wherein the data component is configured to store or wirelessly transmit data received from the first inspection sensor suite and the second inspection sensor suite; a UAV recharging station on the support vehicle, the UAV recharging station configured to recharge the power component of the UAV; and a support vehicle recharging station at the first inspection site, the support vehicle recharging station configured to wirelessly recharge the support vehicle.

Alternatively, or in addition to the other examples described herein, examples include any combination of the following:

the navigation sensor suite comprises a sensor selected from the list consisting of: a radio-based position tracker, an optical camera, and a range finder;

the navigation component is configured to deviate from the first route, based at least upon detecting an anomalous condition with the first inspection sensor suite, for further investigation of the anomalous condition;

detecting an anomalous condition with the first inspection sensor suite;

deviating from the first route, based at least upon detecting an anomalous condition with the first inspection sensor suite, for further investigation of the anomalous condition;

the navigation component comprises an ML component;

a deviation from the first route is determined by the ML component;

determining, by the ML component, a deviation from the first route, for further investigation of the anomalous condition;

training the ML component;

the first inspection sensor suite comprises a sensor selected from the list consisting of: an optical camera, a thermal imaging sensor, an RF sensor, and an inventory management sensor;

the first inspection sensor suite comprises an RF sensor and the first route is a route for collecting antenna or radio transmitter performance measurements at a far field distance from an antenna on a tower at the first site;

the RF sensor comprises a sensor selected from the list consisting of: an RF field strength sensor and an RF spectrum analyzer;

the inventory management sensor comprises a sensor selected from the list consisting of: an RF identification (RFID) tag reader and a barcode scanner;

a second inspection sensor suite having at least one different sensor type than the first inspection sensor suite;

the second inspection sensor suite comprises a sensor selected from the list consisting of an optical camera, a thermal imaging sensor, an RF sensor, and an inventory management sensor;

the navigation component is further configured to o the first inspection site;

flying a second route, subject to collision avoidance using at least input from the navigation sensor suite, at the first inspection site;

the second route is based at least upon a sensor type of the second inspection sensor suite;

the second inspection sensor suite comprises an optical camera and the second route is a route for inspecting the tower at the first inspection site for damage and foreign objects;

the data component is further configured to store or wirelessly transmit data received from the second inspection sensor suite;

receiving, by the data component of the UAV, data from the second inspection sensor suite;

the UAV is further configured to automatically detach the first inspection sensor suite;

automatically detaching the first inspection sensor suite;

the UAV is further configured to automatically detach the first inspection sensor suite at the support vehicle;

automatically detaching the first inspection sensor suite at the support vehicle;

the UAV is further configured to automatically affix the second inspection sensor suite;

automatically affixing the second inspection sensor suite;

the UAV is further configured to automatically affix the second inspection sensor suite at the support vehicle;

automatically affixing the second inspection sensor suite at the support vehicle;

a UAV recharging station on the support vehicle configured to recharge the power component of the UAV;

recharging a power component of the UAV using a UAV recharging station on the support vehicle;

a wireless UAV recharging station on the support vehicle configured to wirelessly recharge the power component of the UAV;

wirelessly recharging a power component of the UAV using a UAV recharging station on the support vehicle;

the support vehicle comprises an internal UAV hangar;

the support vehicle comprises a hangar door configured to automatically open to permit deployment of the UAV from the support vehicle and to automatically close when the UAV is within the UAV hangar, to protect the UAV during navigation of the support vehicle;

a data backup component on the support vehicle;

performing a data backup on the support vehicle;

a data store for site history analysis; and the support vehicle comprises a UGV;

the support vehicle comprises a UGV configured to autonomously navigate from a staging location to the first inspection site;

autonomously navigating, by the support vehicle, from a staging location to the first inspection site;

the support vehicle is further configured to autonomously navigate from the first inspection site to a second inspection site;

autonomously navigating, by the support vehicle, from the first inspection site to a second inspection site;

a support vehicle recharging station at the first inspection site;

recharging the support vehicle using a support vehicle recharging station at the first inspection site;

the support vehicle recharging station is configured to wirelessly recharge the support vehicle;

wirelessly recharging the support vehicle using a support vehicle recharging station at the first inspection site;

a plurality of support vehicles, each support vehicle having at least one UAV; and each UAV configured to: autonomously deploy from the support vehicle; fly a route based at least upon a sensor type of an affixed inspection sensor suite; and autonomously return to the support vehicle, based at least upon completion of assigned inspections; and store or wirelessly transmit data received from the affixed inspection sensor suite;

autonomously deploying a plurality of support vehicles to a plurality of inspection sites, each support vehicle having at least one UAV; and each UAV configured to autonomously deploy from its respective support vehicle, fly a route based at least upon a sensor type of an affixed inspection sensor suite, automatically return to its respective support vehicle, based at least upon completion of assigned inspections, and store or wirelessly transmit data received from the affixed inspection sensor suite;

a second UAV having: a second power component; a second propulsion component coupled to the second power component; a second navigation component coupled to the second propulsion component, the second navigation component comprising a second navigation sensor suite; a third inspection sensor suite having at least one different sensor type than the first inspection sensor suite; and a second data component communicatively coupled to the third sensor suite; wherein the second navigation component is configured for collision avoidance using at least input from the second navigation sensor suite; wherein the second navigation component is further configured to: deploy the second UAV from the support vehicle; fly a third route, subject to collision avoidance, at the first inspection site, wherein the third route is based at least upon a sensor type of the third inspection sensor suite; and autonomously return to the support vehicle, based at least upon completion of assigned inspections; and wherein the second data component is configured to store or wirelessly transmit data received from the third inspection sensor suite; and autonomously deploying a second UAV from the support vehicle; the second UAV having a third inspection sensor suite having at least one different sensor type than the first inspection sensor suite; flying a third route, by the second UAV, subject to collision avoidance, at the first inspection site, wherein the third route is based at least upon a sensor type of the third inspection sensor suite; receiving, by a second data component of the second UAV, data from the third inspection sensor suite; autonomously returning the second UAV to the support vehicle, based at least upon completion of assigned inspections; and storing or wirelessly transmitting the data received by the second data component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. An autonomous inspection system comprising:
an unmanned aerial vehicle (UAV) comprising:
a navigation system; and
an inspection sensor suite including different types of sensors;
wherein the navigation system is configured for collision avoidance using at least one input from the inspection sensor suite; and
wherein the navigation system is configured to:
autonomously deploy the UAV from a support vehicle;
autonomously navigate the UAV to fly an inspection route, subject to collision avoidance, at a cellular tower, the inspection route being at least partially based on the different types of sensors included in the inspection sensor suite such that each of the different types of sensors in the inspection sensor suite are positioned, or otherwise oriented, at some point during the inspection route for inspecting a corresponding condition, characteristic, or feature of the cellular tower, wherein the inspection sensor suite comprises a radio frequency (RF) sensor configured to inspect an antenna beam pointing direction of an antenna of the cellular tower, an optical camera configured to inspect a physical alignment of the antenna having azimuth, tilt, plumb, and height dimensions, a thermal imaging sensor configured to inspect for excess heat being generated by electrical components of the cellular tower, and an RF identification (RFID) reader or barcode sensor configured to inspect an RFID tag or barcode label identifying the cellular tower for inventory management purposes;
autonomously modify the inspection route in response to an anomalous condition of the cell tower detected by the inspection sensor suite while navigating the UAV to fly the inspection route, wherein the inspection route is autonomously modified by the navigation system to allow for closer inspection of the anomalous condition by the inspection sensor suite; and
autonomously return to the support vehicle upon completion of at least the modified inspection route.

2. The autonomous inspection system of claim 1, wherein the support vehicle comprises an unmanned ground vehicle (UGV) configured to autonomously navigate from a staging location to the cellular tower.

3. The autonomous inspection system of claim 1, wherein the cellular tower is a first inspection site, and wherein the support vehicle is further configured to autonomously navigate from the first inspection site to a second inspection site.

4. The autonomous inspection system of claim 1, further comprising:
a support vehicle recharging station at the cellular tower, the support vehicle recharging station configured to wirelessly recharge the support vehicle.

5. The autonomous inspection system of claim 1, wherein the navigation system autonomously modifies a segment of the inspection route without modifying other segments of the inspection route.

6. The autonomous inspection system of claim 5, wherein the inspection route includes a segment for evaluating a far field characteristic of the cellular tower, and wherein the segment is modified to allow for closer inspection of the far field characteristic.

7. The autonomous inspection system of claim 5, wherein the inspection route includes a segment for inspecting an antenna of the cellular tower for damage, and where the segment is modified to allow for closer inspection of the antenna.

8. The autonomous inspection system of claim 5, wherein the inspection route includes a segment for inspecting the cellular tower for foreign objects, and wherein the is modified to allow for closer inspection of a detected foreign object.

9. An autonomous inspection method comprising:
autonomously deploying an unmanned aerial vehicle (UAV) from a support vehicle;
autonomously navigating, by a navigation system of the UAV, the UAV to fly an inspection route, subject to collision avoidance, at a cellular tower, the inspection route being at least partially based on different types of sensors included in an inspection sensor suite of the UAV such that each of the different types of sensors in the inspection sensor suite are positioned, or otherwise oriented, at some point during the inspection route for inspecting a corresponding condition, characteristic, or feature of the cellular tower, wherein the inspection sensor suite comprises a radio frequency (RF) sensor configured to inspect an antenna beam pointing direction of an antenna of the cellular tower, an optical camera configured to inspect a physical alignment of the antenna having azimuth, tilt, plumb, and height dimensions, a thermal imaging sensor configured to inspect for the presence of excess heat generated by electrical components of the cellular tower, and an RF identification (RFID) reader or barcode sensor configured to inspect an RFID tag or barcode label identifying the cellular tower for inventory management purposes;

autonomously modifying the inspection route in response to an anomalous condition of the cell tower detected by the inspection sensor suite while navigating the UAV to fly the inspection route, wherein the inspection route is autonomously modified by the navigation system to allow for closer inspection of the anomalous condition by the inspection sensor suite; and autonomously returning the UAV to the support vehicle upon completion of at least the modified inspection route.

10. The autonomous inspection method of claim 9, wherein the support vehicle comprises an unmanned ground vehicle (UGV) configured to autonomously navigate from a staging location to the cellular tower.

11. The autonomous inspection method of claim 9, wherein the navigation system autonomously modifies a segment of the inspection route without modifying other segments of the inspection route.

12. The autonomous inspection method of claim 11, wherein the inspection route includes a segment for evaluating a far field characteristic of the cellular tower, and wherein the segment is modified to allow for closer inspection of the far field characteristic.

13. The autonomous inspection method of claim 11, wherein the inspection route includes a segment for inspecting an antenna of the cellular tower for damage, and where the segment is modified to allow for closer inspection of the antenna.

14. The autonomous inspection method of claim 11, wherein the inspection route includes a segment for inspecting the cellular tower for foreign objects, and wherein the is modified to allow for closer inspection of a detected foreign object.

15. An autonomous navigation system comprising:
a processor; and
computer-readable memory storing programming instructions for execution by the processor, the programming instructions including instruction to:

autonomously deploy an unmanned aerial vehicle (UAV) from a support vehicle;

autonomously navigate the UAV to fly an inspection route, subject to collision avoidance, at a cellular tower, the inspection route being at least partially based on different types of sensors included in an inspection sensor suite of the UAV such that each of the different types of sensors in the inspection sensor suite are positioned, or otherwise oriented, at some point during the inspection route for inspecting a corresponding condition, characteristic, or feature of the cellular tower, wherein the inspection sensor suite comprises a radio frequency (RF) sensor configured to inspect an antenna beam pointing direction of an antenna of the cellular tower, an optical camera configured to inspect a physical alignment of the antenna having azimuth, tilt, plumb, and height dimensions, a thermal imaging sensor configured to inspect for the presence of excess heat generated by electrical components of the cellular tower, and an RF identification (RFID) reader or barcode sensor configured to inspect an RFID tag or barcode label identifying the cellular tower for inventory management purposes;

autonomously modify the inspection route in response to an anomalous condition of the cell tower detected by the inspection sensor suite while navigating the UAV to fly the inspection route, wherein the inspection route is autonomously modified by the navigation system to allow for closer inspection of the anomalous condition by the inspection sensor suite; and autonomously return the UAV to the support vehicle upon completion of at least the modified inspection route.

16. The autonomous navigation system of claim 15, wherein the support vehicle comprises an unmanned ground vehicle (UGV) configured to autonomously navigate from a staging location to the cellular tower.

17. The autonomous navigation system of claim 15, wherein the autonomous navigation system autonomously modifies a segment of the inspection route without modifying other segments of the inspection route.

18. The autonomous navigation system of claim 17, wherein the inspection route includes a segment for evaluating a far field characteristic of the cellular tower, and wherein the segment is modified to allow for closer inspection of the far field characteristic.

19. The autonomous navigation system of claim 17, wherein the inspection route includes a segment for inspecting an antenna of the cellular tower for damage, and wherein the segment is modified to allow for closer inspection of the antenna.

20. The autonomous navigation system of claim 17, wherein the inspection route includes a segment for inspecting the cellular tower for foreign objects, and wherein the is modified to allow for closer inspection of a detected foreign object.

* * * * *